United States Patent Office 3,649,605
Patented Mar. 14, 1972

3,649,605
SYSTEM FOR THE POLYMERIZATION OF CONJUGATED DIOLEFINS
Morford C. Throckmorton, Akron, Ohio, assignor to The Goodyear Tire & Rubber Company, Akron, Ohio
No Drawing. Filed Mar. 30, 1970, Ser. No. 23,969
Int. Cl. C08d 3/04, 3/08, 1/00
U.S. Cl. 260—82.1          7 Claims

ABSTRACT OF THE DISCLOSURE

There is disclosed a process for polymerizing butadiene or butadiene in mixture with isoprene to give polymers having 95% or more of the butadiene units in the cis-1,4 configuration and high molecular weights employing a four component catalyst system comprised of (1) at least one organometallic compound, (2) at least one organonickel compound, (3) at least one organic acid fluoride compound, and (4) at least one promoter compound.

---

This invention is directed to methods of polymerizing butadiene or butadiene in mixture with isoprene to form polymers or copolymers having a high portion of the butadiene units in the cis-1,4 configuration and having high molecular weights. It is also directed to catalyst systems useful for this purpose.

Polymers of butadiene or copolymers of butadiene in mixture with isoprene containing a high proportion of the butadiene units in the cis-1,4 configuration and having high molecular weights possess properties which make them useful as synthetic rubbers.

Thus, it is an object of this invention to provide a method whereby butadiene can be polymerized to polymers containing 95% or more of the butadiene units in this cis-1,4 configuration. Another object is to form copolymers of butadiene and isoprene which contain 95% or more of the butadiene units in cis-1,4 configuration. Yet another object is to produce polymers of butadiene and copolymers of butadiene and isoprene which possess high molecular weights. Another object is to provide a catalyst system by which those polymerizations may be accomplished. Other objects will become apparent as the description proceeds.

One method by which a butadiene polymer containing a high cis-1,4 content can be prepared is by contacting butadiene under polymerization conditions with a catalyst system comprising (1) at least one compound selected from a group consisting of organoaluminum, organomagnesium, organozinc and organolithium compound, (2) at least one organonickel compound selected from a group consisting of nickel salts or carboxylic acids, organic complex compounds of nickel and nickel tetracarbonyl, and (3) certain organic fluorochemical compounds. Another method by which a high cis-1,4 containing butadiene polymer can be produced is to employ inorganic acid fluorides or their corresponding esters in place of the organic fluorochemical compounds of the method described above. However, neither of these two methods product butadiene polymers containing both high cis-1,4 content and high molecular weight.

It has now been discovered that when organic acid fluorides are employed in conjunction with a fourth component, known as a catalyst promoter, an active catalyst is produced, capable of polymerizing butadiene or butadiene in mixture with isoprene to polymers and copolymers containing a high portion of the butadiene units in the cis-1,4 configuration and having high molecular weights.

Thus, according to the present invention, butadiene or butadiene in mixture with isoprene is polymerized by contacting, under polymerization conditions, butadiene or butadiene in mixture with isoprene with a catalyst system comprising.

(A) At least one organometallic compound selected from the group consisting of organometallic compounds corresponding to the formulae (1) $\quad AlR_1R_2R_3$ in which $R_1$ is selected from a group consisting of alkyl (including cycloalkyl), aryl, alkaryl, aralkyl, hydrogen and fluorine; $R_2$ and $R_3$ being selected from the group consisting of alkyl (including cycloalkyl), aryl, alkaryl, alkoxy and arylalkyl;

(2) $\quad RMgF$ wherein R may be alkyl, aryl, arylalkyl or alkaryl;

(3) $\quad R'R''Mg$ wherein R' may be alkyl, aryl, arylalkyl or alkaryl; R'' may be alkyl, aryl, arylalkyl or alkaryl radicals and wherein R' and R'' may or may not be the same;

(4) $\quad R_2Zn$ wherein R may be alkyl, aryl, arylalkyl or alkaryl;

(5) $\quad R-Li$ wherein R may be alkyl, aryl, alkaryl or arylalkyl;

(B) At least one organonickel compound selected from the group consisting of:

(1) nickel salts of carboxylic acids,
(2) organic complex compounds of nickel,
(3) nickel tetracarbonyl;

(C) At least one organic acid fluoride corresponding to the formula

wherein R is a radical selected from a group consisting of alkyl (including cycloalkyl), aryl, arylalkyl and alkaryl, and (D) At least one compound selected from a group consisting of:

(1) water,
(2) phenols,
(3) organic acids,
(4) alcohols, and
(5) peroxides.

By the term "organoaluminum compound" is meant an organoaluminum compound corresponding to the formula $$AlR_1R_2R_3$$

in which $R_1$ is selected from the group consisting of alkyl (including cycloalkyl), aryl, alkaryl, arylalkyl, hydrogen and fluorine, $R_2$ and $R_3$ being selected from the group of alkyl (including cycloalkyl), aryl, alkaryl, alkoxy and arylalkyl. Representative of the compounds corresponding to the formula set forth above are: diethylaluminum fluoride, diisobutylaluminum fluoride, di-n-propylaluminum fluoride, di-n-butylaluminum fluoride, dihexylaluminum fluoride, dioctylaluminum fluoride, and diphenylaluminum fluoride. Also included are diethylaluminum hydride, di-n-propylaluminum hydride, di-n-butylaluminum hydride, diisobutylaluminum hydride, diphenylaluminum hydride, di-p-tolylaluminum hydride, dibenzylaluminum hydride, phenylethylaluminum hydride, phenyl-n-propylaluminum hydride, p-tolylethylaluminum hydride, p-tolyl-n-propylaluminum hydride, p-tolylisopropylaluminum hydride, benzylethylaluminum hydride, and other organoaluminum hydrides. Also included are diethylethoxyaluminum and dipropylethoxyaluminum. Also included are trimethylaluminum, triethylaluminum, tri-n-propylaluminum, triisopropylaluminum, tri-n-butylaluminum, triisobutylaluminum, tripentylaluminum, trihexylaluminum, tricyclohexylaluminum, trioctylaluminum, triphenylaluminum, tri-p-tolylaluminum, tribenzylaluminum, ethyldiphenylaluminum, ethyl-di-p-tolylaluminum, ethyldibenzylaluminum, diethylphenylaluminum, diethyl-p-tolylaluminum, diethylbenzylaluminum and other triorganoaluminum compounds.

By the term "organomagnesium compounds" is meant any organomagnesium compound or any organomagnesium halide of the Grignard type corresponding to the formula $$R'R''Mg$$

wherein R' is selected from a group consisting of alkyl, aryl, alkaryl, arylalkyl and fluorine and R" is selected from a group consisting of alkyl, aryl, alkaryl and aralkyl radicals and in which R' and R" may or may not be the same. Representative examples of compounds corresponding to the above formula include diethylmagnesium, dipropylmagnesium, ethylmagnesium fluoride, phenylmagnesium fluoride and the like.

By the term "organozinc compound" is meant any organozinc compound corresponding to the formula $R_2Zn$ wherein R may be alkyl, aryl, alkaryl or arylalkyl. Representative among such compounds are diethylzinc, dibutylzinc, diphenylzinc and the like.

By the term "organolithium compounds" is meant any organolithium compound corresponding to the formula R—Li, where R is selected from a group consisting of alkyl, aryl, alkaryl and arylalkyl radicals. Representative examples of compounds corresponding to the formula set forth above include ethyllithium, propyllithium, n-, sec- and t-butyllithium, hexyllithium, styryllithium, phenyllithium and the like.

The (B) catalyst component is selected from a class consisting of (1) a nickel salt of a carboxylic acid, (2) an organic complex compound of nickel, and (3) nickel tetracarbonyl. These compounds can be compounds of the said metal with a mono- or bidentate organic ligand containing up to 20 carbon atoms. "Ligand" is defined as an ion or molecule bound to and considered bonded to a metal atom or ion. Monodentate means having one position through which covalent or coordinate bonds with the metal may be formed; bidentate means having two positions through which covalent or coordinate bonds with the metal may be formed. These compounds can also be compounds wherein the bonding between the nickel and the organic group is not of the classical covalent or coordinate type as described above, but rather one based on vacant pi orbitals arising from double bonded structures in the organic moiety.

Representative examples of the nickel salts of carboxylic acids and organic complex compounds of nickel are nickel benzoate, nickel, acetate, nickel naphthenate, bis (alpha furyl dioxime) nickel, nickel octanoate, nickel palmitate, nickel stearate, nickel acetylacetonate, bis(salicylaldehyde ethylene diimine) nickel and nickel salicylaldehyde.

The (C) catalyst component is an organic acid fluoride corresponding to the formula $$R-\overset{O}{\underset{\|}{C}}-F$$

wherein R is a radical selected from a group consisting of alkyl (including cycloalkyl), aryl, arylalkyl and alkaryl radicals. Representative examples of compounds corresponding to the above formula include trifluoroacetyl fluoride, monofluoroacetyl fluoride, difluoro-monochloroacetyl fluoride, perfluorobenzoyl fluoride, acetyl fluoride, butyryl fluoride, benzoyl fluoride, cyclohexanecarbonyl fluoride, phthaloyl fluoride, m-trifluoromethylbenzoyl fluoride and the like.

As stated above, the (D) component, a compound capable of functioning as a catalyst promoter, is selected from a group consisting of water, phenols, organic acids, alcohols and peroxides. Representative examples of phenols capable of functioning as a promoter in the catalytic polymerization of butadiene include phenol, ortho-cresol, para-cresol and the like. Representative examples of the types of organic acids which function as catalytic promoters include acetic acid, formic acid, propionic acid, butyric acid, malonic acid, maleic acid, trifluoroacetic acid and the like. Representative examples of the types of alcohols which cooperate with the other catalyst components of this invention to polymerize butadiene include butanol, ethanol, hexanol, isopropanol, methanol, pentanol, propanol, t-butyl alcohol, benzyl alcohol, $\alpha,\alpha$-dimethyl benzyl alcohol and the like. Representative examples of peroxides which function as catalytic promoters include hydrogen peroxide, cumene hydroperoxide, t-butyl hydroperoxide, benzoyl hydroperoxide, dicumyl peroxide, para-menthane hydroperoxide and the like.

The four component catalyst system of this invention has shown polymerization activity over a wide range of catalyst concentrations and catalyst ratios. Apparently, the four catalyst components interreact to form the active catalyst. As a result, the optimum concentration for any one catalyst component is dependent upon the concentration of each of the other catalyst components. Although polymerization will occur over a wide range of catalyst concentrations and ratios, polymers having the most desirable properties are obtained over a narrower range. It has been found that polymerization will occur when the mole ratio of the (A) catalyst component to the (B) catalyst component ranges from about 0.3/1 to about 300/1 and when the mole ratio of the (C) catalyst component ranges from about 3/1 to about 1000/1 and when the mole ratio of the (C) catalyst component to the (A) catalyst component ranges from about 0.3/1 to about 75/1 and where the mole ratio of the (C) catalyst component to the (D) catalyst component ranges from about 2/1 to about 100/1.

The preferred mole ratios of $(A)/(B)$ range from about 2/1 to about 80/1; the preferred mole ratios of $(C)/(B)$ range from about 5/1 to about 500/1; the preferred mole ratios of $(C)/(A)$ range from about 1/1 to about 30/1; and the preferred mole ratios of $(C)/(D)$ range from about 4/1 to about 60/1.

The four catalyst components may be charged to the polymerization system as separate catalyst components in either a stepwise or a simultaneous manner sometimes referred to as the "in situ" method. The catalyst may also be "preformed" outside the polymerization system whereby all the catalyst components are mixed in the absence of the butadiene either with or without an inert diluent and the complete blend then added to the polymerization system.

The catalyst may also be "preformed" outside the polymerization system whereby all of the catalyst components are mixed in the presence of butadiene. The amount of butadiene present can vary over a wide range but must be a catalytic amount. For good results the mole ratio butadiene to the nickel or (B) catalyst component can range from about 0.2/1 to about 1000/1. However, a preferred mole ratio of butadiene to the (B) catalyst component ranges from about 8/1 to about 500/1.

The concentration of the total catalyst system employed depends on a number of factors such as purity of the system, polymerization rate desired, temperature and other factors, therefore, specific concentrations cannot be set forth except to say that catalytic amounts are used. Some specific concentrations and ratios which produce elastomers having desirable properties will be illustrated in the examples given herein to explain the teachings of this invention.

In general, the polymerizations of this invention are carried out in any inert solvent, and thus, are solution polymerizations. By the term "inert solvent" is meant that the solvent or diluent does not enter into the structure of the resulting polymer nor does it adversely affect the properties of the resulting polymer nor does it have any adverse effect on the activity of the catalyst employed. Such solvents are usually aliphatic, aromatic, cycloaliphatic hydrocarbons and ethers, representative of which are pentane, hexane, heptane, toluene, benzene, cyclohexane, diisopropyl ether and the like. Preferred solvents are hexane and benzene. The solvent/monomer volume ratio may be varied over a wide range. Up to 20 or more to 1 volume ratio of solvent to monomer can be employed. It is usually preferred or more convenient to use a solvent/monomer volume ratio of about 3/1 to about 6/1. Suspension polymerization may be carried out by using a solvent, such as butane or pentane, in which the polymer formed is insoluble. It should be understood, however, that it is not intended to exclude bulk polymerizations from the scope of this application. The polymerization may be continuous or batch type.

It is usually desirable to conduct the polymerizations of this invention employing air-free and moisture-free techniques.

The temperatures employed in the practice of this invention have not been found to be critical and may vary from a low temperature, such as —10° C. or below, up to high temperatures of 100° C. or higher. However, a more desirable temperature range is between about 30° C. and about 90° C. Ambient pressures are usually used but higher or lower pressures may be employed.

As employed in this specification, inherent viscosity, [η] is defined as the natural logarithm of the relative viscosity at 30° C. divided by the polymer concentration for a 0.5 percent (wt./vol.) solution in toluene and is expressed in deciliters per gram (dl./g.). Inherent viscosity is employed as an indicia of the molecular weight of any given polymer. The higher the inherent viscosity the higher the molecular weight.

The practice of this invention is further illustrated by reference to the following examples which are intended to be representative rather than restrictive of the scope of this invention.

EXAMPLE I

A purified butadiene (BD) in benzene solution containing 100 grams (g.) of butadiene per liter of solution was charged to a number of 4-ounce reaction bottles. Nitrogen was flushed over the surface of the premix and the catalyst charged in situ in the amounts shown in the table below. The catalyst and their order of addition were (1) triethylaluminum (TEAL), (2) nickel octanoate (NiOct) and (3) organic acid fluoride. Experiments Nos. 1 and 2 employed benzoyl fluoride as the organic acid fluoride while meta-trifluoromethylbenzoyl fluoride was the organic acid fluoride employed in Experiments Nos. 3 and 4. Water ($H_2O$) was employed as the catalyst promoter and was added after all the other catalyst components were added in the amounts shown in the table below. The bottles were then sealed and tumbled end over end for varying lengths of time in a 50° C. water bath.

TABLE 1

| Expt. No. | Millimole/100 g. BD | | | | Time, hours | Yield, weight percent | [η] | Percent cis-1,4 |
|---|---|---|---|---|---|---|---|---|
| | TEAL | NiOct | A.F.[1] | $H_2O$ | | | | |
| 1 | 0.85 | 0.05 | 4.5 | 0.22 | 24 | 24 | 3.84 | 96.6 |
| 2 | 0.75 | 0.05 | 10.0 | 0.44 | 72 | 50 | 4.15 | 96.2 |
| 3 | 0.75 | 0.05 | 2 | 0.11 | 45 | 20 | 3.2 | 96.2 |
| 4 | 0.75 | 0.05 | 2 | 0.44 | 72 | 54 | 2.7 | 95.8 |

[1] A.F. is abbreviation for acid fluoride.

COMPARATIVE EXAMPLE

Two polymerizations were carried out similar to Example I above except no water was employed as a catalyst promoter. Experiment No. 1 employed benzoyl fluoride as the organic acid fluoride component while meta-trifluoromethylbenzoyl fluoride was employed in Experiment No. 2. All other reactants were the same as in Example I. The table below contains all pertinent data. Both experiments were run from 17–18 hours at 50° C.

TABLE

| Expt. No. | Millimole/100 g. BD | | | Yield, weight percent |
|---|---|---|---|---|
| | TEAL | NiOct | A.F. | |
| 1 | 0.85 | 0.05 | 4.5 | 0 |
| 2 | 0.75 | 0.05 | 2.0 | 0 |

EXAMPLE II

A series of polymerizations was carried out similar to Example I except that acetyl fluoride was employed as the organic acid fluoride and the water was replaced with other materials capable of functioning as catalyst promoters. These other materials included t-butyl alcohol (t-$C_4H_9OH$), benzyl alcohol ($C_6H_5CH_2OH$), ethanol ($C_2H_5OH$), t-butyl hydroperoxide (t-$C_4H_9$—O—OH), acetic acid ($CH_3COOH$), trifluoroacetic acid ($CF_3COOH$)

and dicumyl peroxide [($C_6H_5C_3H_6O)_2$]. The amounts of triethyl aluminum, nickel octanoate and acetyl fluoride employed were constant throughout all the experiments and were 0.90, 0.05 and 6.0 millimoles per 100 grams of butadiene respectively. Table 2 below gives all pertinent data. All experiments were run at 50° C. for the times indicated:

TABLE 2

| Expt. No. | Promoter | Millimole/ 100 g. BD | Time, hours | Yield, weight percent | [η] | Percent cis-1,4 |
|---|---|---|---|---|---|---|
| 1 | t-$C_4H_9OH$ | 0.22 | 23 | 16 | | |
| 2 | t-$C_4H_9OH$ | 0.88 | 23 | 67 | 3.31 | 96.1 |
| 3 | $C_6H_5CH_2OH$ | 0.88 | 23 | 66 | 2.76 | 96.6 |
| 4 | $C_2H_5OH$ | 0.44 | 46 | 41 | 3.66 | |
| 5 | $C_2H_5OH$ | 0.88 | 46 | 20 | | |
| 6 | t-$C_4H_9$—O—OH | 0.50 | 46 | 56 | 4.46 | 96.5 |
| 7 | $CH_3COOH$ | 0.15 | 23 | 20 | 4.26 | |
| 8 | $CF_3COOH$ | 0.10 | 46 | 46 | 3.25 | |
| 9 | $CF_3COOH$ | 0.50 | 23 | 30 | | |
| 10 | ($C_6H_5C_3H_6O$—)$_2$ | 0.20 | 23 | 52 | 4.13 | 96.5 |
| 11 | ($C_6H_5C_3H_6O$—)$_2$ | 0.40 | 3 | 33 | | |

EXAMPLE III

A series of polymerizations was carried out similar to Example I except that acetyl fluoride (AcF) was the organic acid fluoride employed. The catalyst components employed and their order of "in situ" addition were (1) TEAL, (2) NiOct, (3) AcF and (4) Water ($H_2O$). All polymerizations were tumbled end over end in a 50° C. water bath for 17 hours. The stabilized polymers were dried under vacuum. The polymers were rubbery, exhibited good tack and processed well on a small mill. All pertinent data concerning the polymerizations is contained in the table following.

TABLE 3

| Expt. No. | Millimole/100 g. BD | | | | Yield, weight percent | [η] |
|---|---|---|---|---|---|---|
| | TEAL | NiOct | AcF | H₂O | | |
| 1 | 0.6 | 0.05 | 3.0 | 0.11 | 67 | 3.1 |
| 2 | 0.9 | 0.05 | 6.0 | 0.22 | 76 | 3.2 |
| 3 | 0.9 | 0.10 | 6.0 | 0.44 | 78 | 2.9 |

EXAMPLE IV

A series of experiments was carried out similar to Example III above except that the water component of the four component catalyst system was added first, followed by the immediate addition of TEAL, NiOct and AcF. All data are contained in the table below. Infrared analysis of the polymer prepared in Experiment No. 2 indicated a cis-1,4 content of 97%.

TABLE 4

| Expt. No. | Millimole/100 g. BD | | | | Yield, weight percent | [η] |
|---|---|---|---|---|---|---|
| | H₂O | TEAL | NiOct | AcF | | |
| 1 | 0.22 | 0.90 | 0.05 | 6.0 | 83 | 3.3 |
| 2 | 0.44 | 0.90 | 0.05 | 6.0 | 82 | 3.0 |

EXAMPLE V

A "preformed" catalyst was prepared by mixing 2.3 millimoles butadiene (BD), 1.0 millimole TEAL, 0.05 millimole NiOct, 6.0 millimoles of acetyl fluoride (AcF) and 0.3 millimole of water. The preformed catalyst was then added to a purified solution containing 100 grams of BD in benzene. The polymerization was carried out at 50° C. for 25 hours. The yield of dried polymer was 27% by weight and the inherent viscosity [η] was found to be 3.4 dl./g.

EXAMPLE VI

An experiment similar to Example V was carried out except that no water was added to a "preformed" catalyst consisting of 4.6 millimoles of butadiene, 1.4 millimoles of TEAL, 0.10 millimole of NiOct and 12 millimoles of acetyl fluoride. After 17 hours at 50° C. no polymerization occurred. Then 0.44 millimole of water was added to the reaction mixture and after 19 additional hours, a 21% by weight yield of high molecular weight polymer was obtained. This polymer had an inherent viscosity of 4.3 dl./g. and infrared analysis indicated a cis-1,4 content of 96.7%.

While certain representative embodiments and details have been shown for the purpose of illustrating the invention, it will be apparent to those skilled in this art that various changes and modifications may be made therein without departing from the spirit or scope of the invention.

What is claimed is:

1. A process for the polymerization of butadiene or butadiene in mixture with isoprene to give polymers having 95% or more of the butadiene units in the cis-1,4 configuration comprising contacting butadiene or butadiene in mixture with isoprene under polymerization conditions with a catalyst system comprising
   (A) at least one organometallic compound selected from the group consisting of organometallic compounds corresponding to the formula (1) $\quad AlR_1R_2R_3$ in which $R_1$ is selected from a group consisting of alkyl (including cycloalkyl), aryl, alkaryl, arylalkyl, hydrogen and fluorine, $R_2$ and $R_3$ being selected from the group consisting of alkyl (including cycloalkyl), aryl, alkaryl, alkoxy and arylalkyl;

(2) $\quad RMgF$ wherein R may be alkyl, aryl, arylalkyl or alkaryl;

(3) $\quad R'R''Mg$ wherein R' may be alkyl, aryl, arylalkyl or alkaryl; R'' may be alkyl, aryl, arylalkyl or alkaryl and wherein R' and R'' may or may not be the same;

(4) $\quad R_2Z^n$ wherein R may be alkyl, aryl, alkaryl and arylalkyl;

(5) $\quad R-Li$ wherein R may be alkyl, aryl, alkaryl and arylalkyl;
   (B) at least one organonickel compound selected from the group consisting of
      (1) nickel salts of carboxylic acids,
      (2) organic complex compounds of nickel,
      (3) nickel tetracarbonyl and
   (C) at least one organic acid fluoride corresponding to the formula

wherein R is selected from a group consisting of alkyl (including cycloalkyl), aryl, arylalkyl and alkaryl, and
   (D) at least one compound selected from a group consisting of
      (1) water,
      (2) phenols,
      (3) organic acids,
      (4) alcohols, and
      (5) peroxides,
   and wherein the mole ratio of (A)/(B) ranges from about 0.3/1 to about 300/1; where the mole ratio of (C)/(B) ranges from about 3/1 to about 1000/1; where the mole ratio of (C)/(A) arranges from about 0.3/1 to about 75/1 and where the mole ratio of (C)/(D) ranges from about 2/1 to about 100/1.

2. A process according to claim wherein the mole ratio of (A)/(B) ranges from about 2/1 to about 80/1; the mole ratio of (C)/(B) ranges from about 5/1 to about 500/1; the mole ratio of (C)/(A) ranges from about 1/1 to about 30/1; and the mole ratio of (C)/(D) ranges from about 4/1 to 60/1.

3. A process according to claim 1 wherein the organometallic compound is selected from a group consisting of trialkylaluminum and dialkylaluminum hydride compounds.

4. A process according to claim 1 in which the oganonickel compound is selected from a group consisting of nickel salts of carboxylic acids and organic complex compounds of nickel.

5. A process according to claim 1 wherein the organic acid fluoride is acetyl fluoride.

6. A process according to claim 1 wherein the (D) catalyst component is selected from the group consisting of water, alcohols, phenol, organic hydroperoxides and dicumyl peroxide.

7. A catalyst composition comprising
   (A) at least one organoaluminum compound,
   (B) at least one organonickel compound selected from the group consisting of nickel salts of carboxylic acids and organic complex compounds of nickel,
   (C) at least one organic acid fluoride compound, and
   (D) at least one compound selected from a group consisting of water, phenols, organic acids, alcohols and peroxides and wherein the mole ratio of (A)/(B) ranges from about 0.3/1 to about 300/1; where the mole ratio of (C)/(B) ranges from about 3/1 to about 1000/1; where the mole ratio of (C)/(A) ranges from about 0.3/1 to about 75/1 and where the mole ratio of (C)/(D) ranges from about 2/1 to about 100/1.

(References on following page)

References Cited

UNITED STATES PATENTS

| | | | |
|---|---|---|---|
| 3,046,265 | 7/1962 | Hazen et al. | 260—94.3 |
| 3,328,376 | 6/1967 | Benemann et al. | 260—94.3 |
| 3,446,787 | 5/1969 | Throckmorton | 260—94.3 |
| 3,446,788 | 5/1969 | Throckmorton | 260—94.3 |
| 3,528,953 | 9/1970 | Throckmorton | 260—94.3 |
| 3,541,063 | 11/1970 | Throckmorton et al. | 260—82.1 |
| 3,542,751 | 11/1970 | Throckmorton | 260—94.3 |
| 3,454,680 | 7/1969 | Okuya et al. | 260—94.3 |

JOSEPH L. SCHOFER, Primary Examiner

R. A. GAITHER, Assistant Examiner

U.S. Cl. X.R.

252—429 B; 260—94.3